(12) United States Patent
Higgins

(10) Patent No.: US 10,920,354 B1
(45) Date of Patent: Feb. 16, 2021

(54) FLOOR COVERING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

(21) Appl. No.: 16/986,321

(22) Filed: Aug. 6, 2020

(51) Int. Cl.
| | |
|---|---|
| *B32B 37/12* | (2006.01) |
| *D05C 17/02* | (2006.01) |
| *B32B 7/12* | (2006.01) |
| *B32B 5/10* | (2006.01) |
| *B32B 5/06* | (2006.01) |
| *A47G 27/02* | (2006.01) |
| *B32B 7/09* | (2019.01) |
| *B32B 37/24* | (2006.01) |

(52) U.S. Cl.
CPC .......... *D05C 17/023* (2013.01); *A47G 27/02* (2013.01); *B32B 5/06* (2013.01); *B32B 5/10* (2013.01); *B32B 7/09* (2019.01); *B32B 7/12* (2013.01); *B32B 37/12* (2013.01); *B32B 37/1284* (2013.01); *B32B 37/24* (2013.01); *B32B 2471/02* (2013.01); *D10B 2503/042* (2013.01)

(58) Field of Classification Search
CPC .......... B32B 2269/021; B32B 2255/02; B32B 2255/26; B32B 5/28; B32B 2255/04; B32B 2471/02; B32B 37/1284; B32B 37/24; B32B 2471/20; D05C 17/02; D06N 2213/065; D06N 2205/15
See application file for complete search history.

(56) References Cited

U.S. PATENT DOCUMENTS

| | | |
|---|---|---|
| 9,339,136 B2 | 5/2016 | Higgins |
| 9,506,175 B2 | 11/2016 | Higgins |
| 9,681,768 B2 | 6/2017 | Higgins |
| 9,775,457 B2 | 10/2017 | Higgins |
| 9,924,820 B2 | 3/2018 | Higgins |
| 9,926,657 B2 | 3/2018 | Higgins |
| 10,132,019 B2 | 11/2018 | Higgins |
| 10,501,878 B2 | 12/2019 | Higgins |
| 2009/0029097 A1* | 1/2009 | Riddle ................ D06N 7/0071 428/95 |

* cited by examiner

*Primary Examiner* — Scott W Dodds
(74) *Attorney, Agent, or Firm* — Hammer & Associates, P.C.

(57) ABSTRACT

A method of making a floor covering including a tufted textile substrate and a reinforcement backing system. The backing system includes adhesive layers which are conditioned to include voids. A layer of reinforcement fibers is positioned between the adhesive layers. After drying, the layers of adhesive and reinforcement fibers are compressed to collapse the voids in the layers of adhesive and to encapsulate the reinforcement fibers. The layer of reinforcement fibers is also moved toward the primary backing substrate and into engagement with the ends of the tufts.

11 Claims, 4 Drawing Sheets

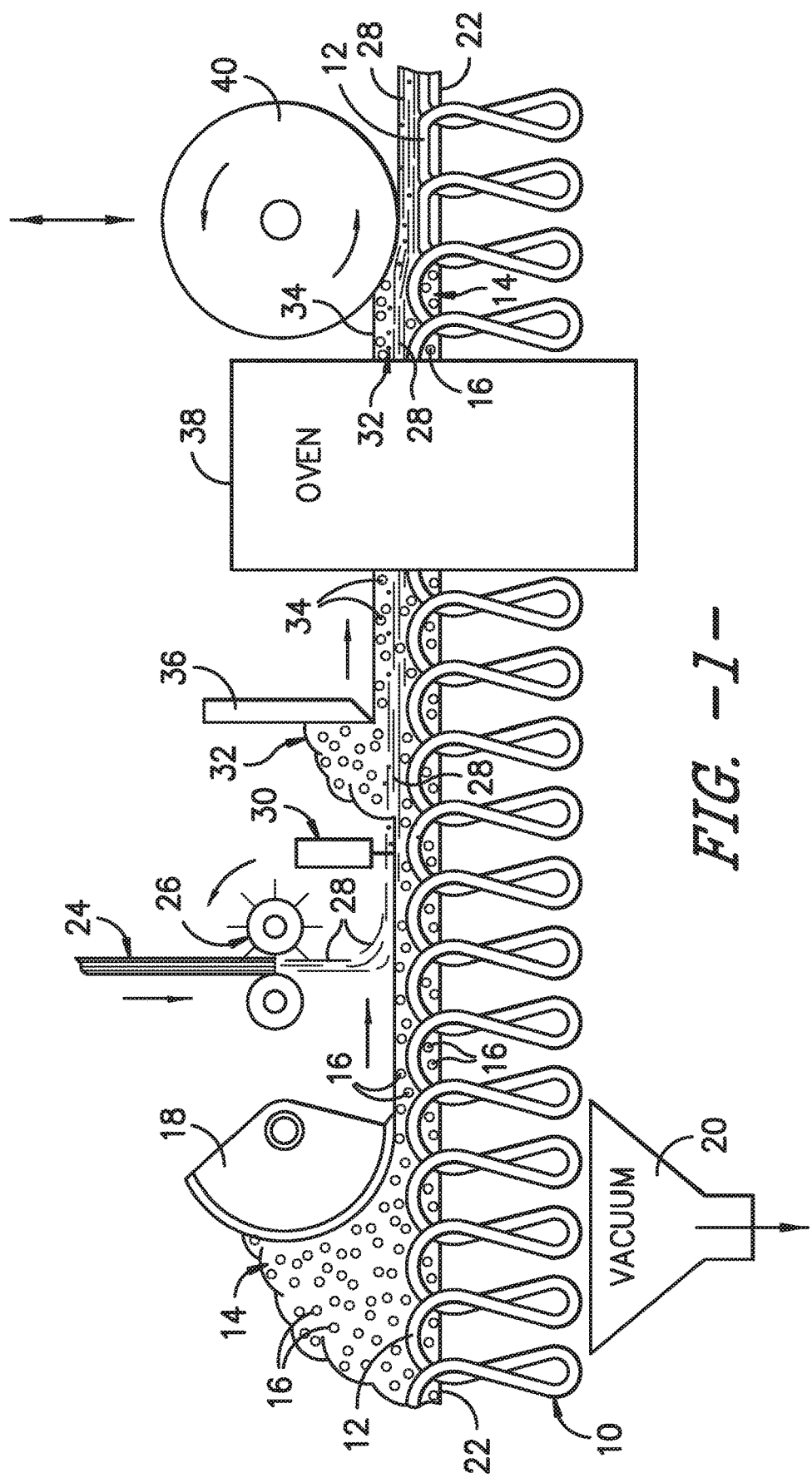

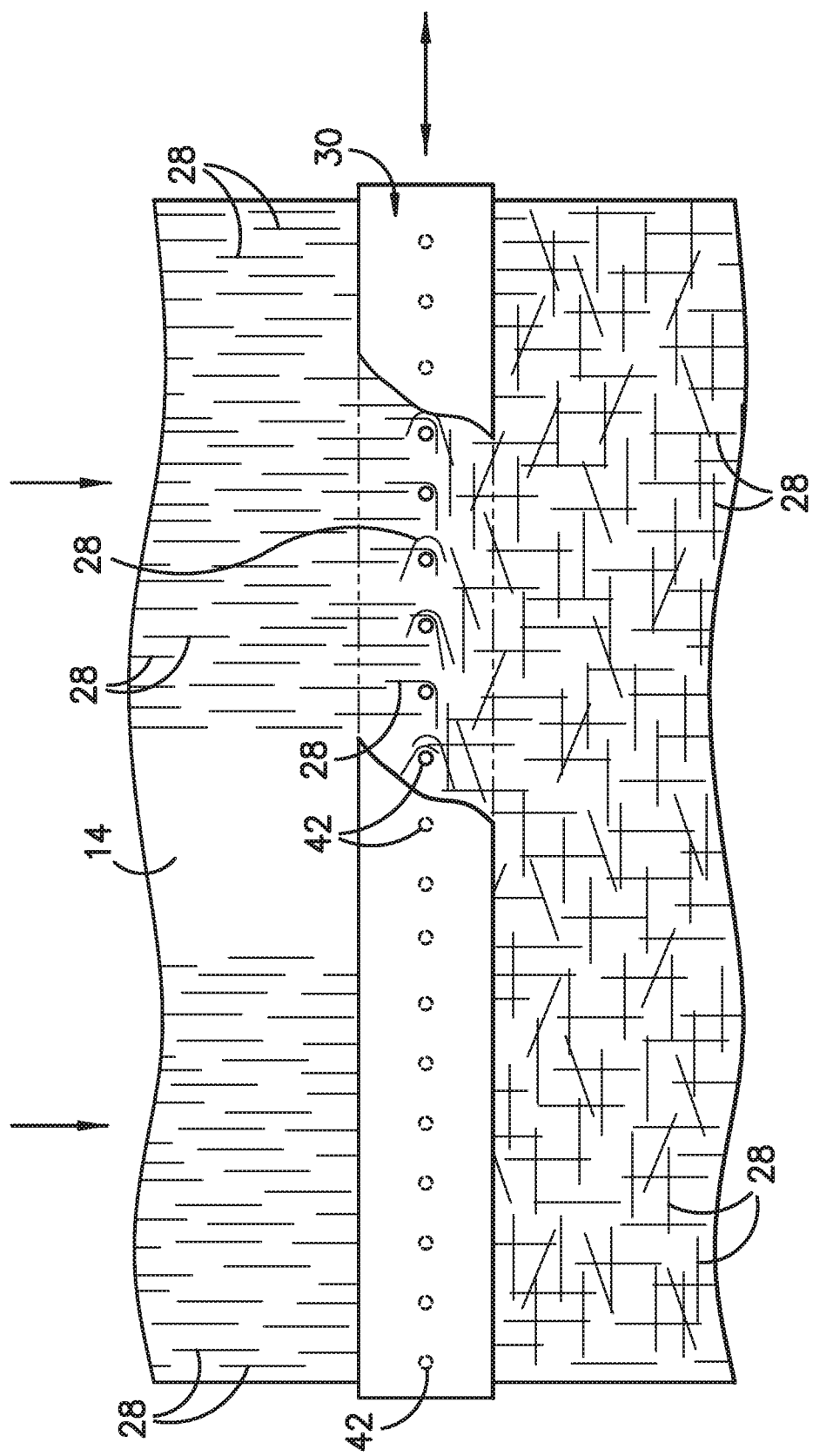
FIG. -2-

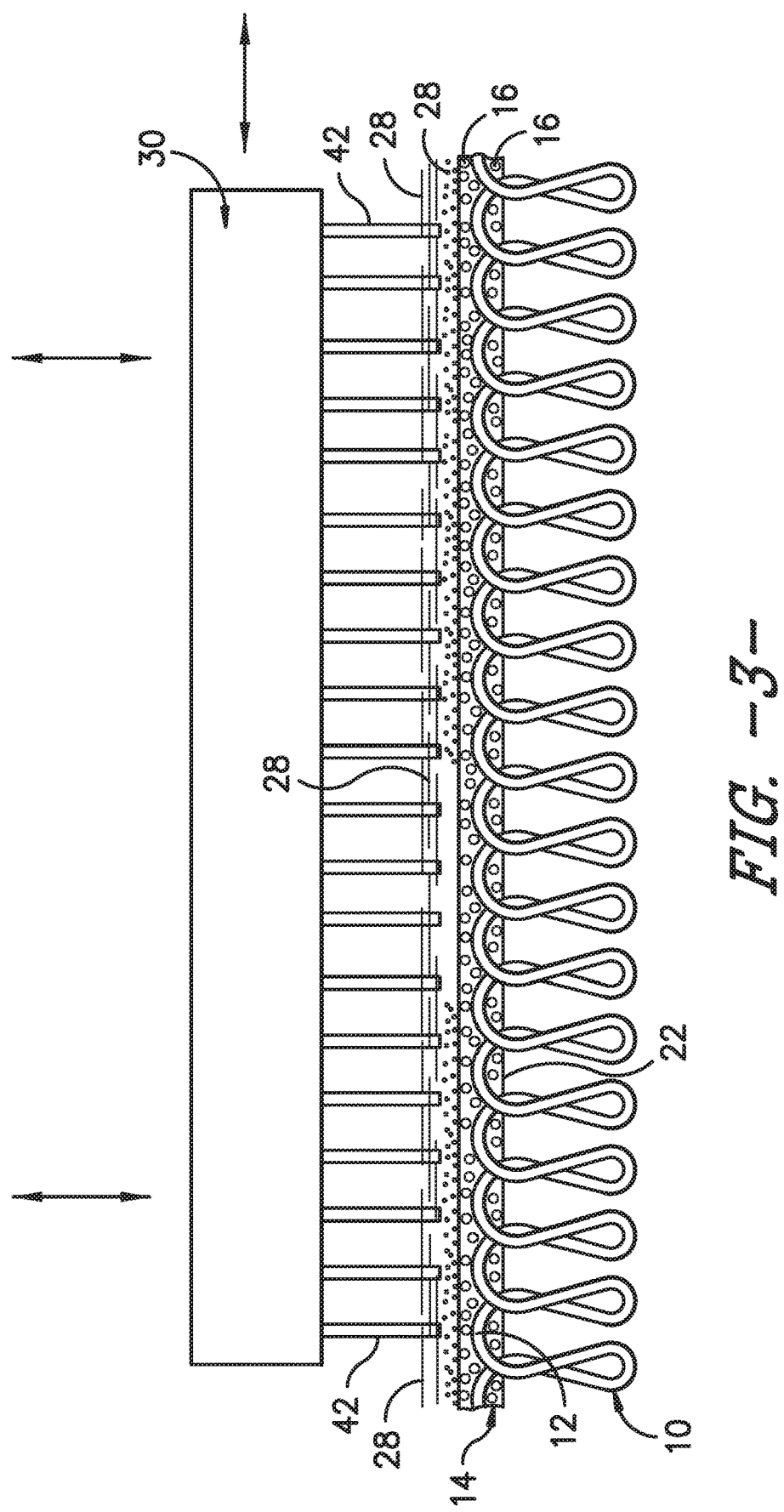
FIG. -3-

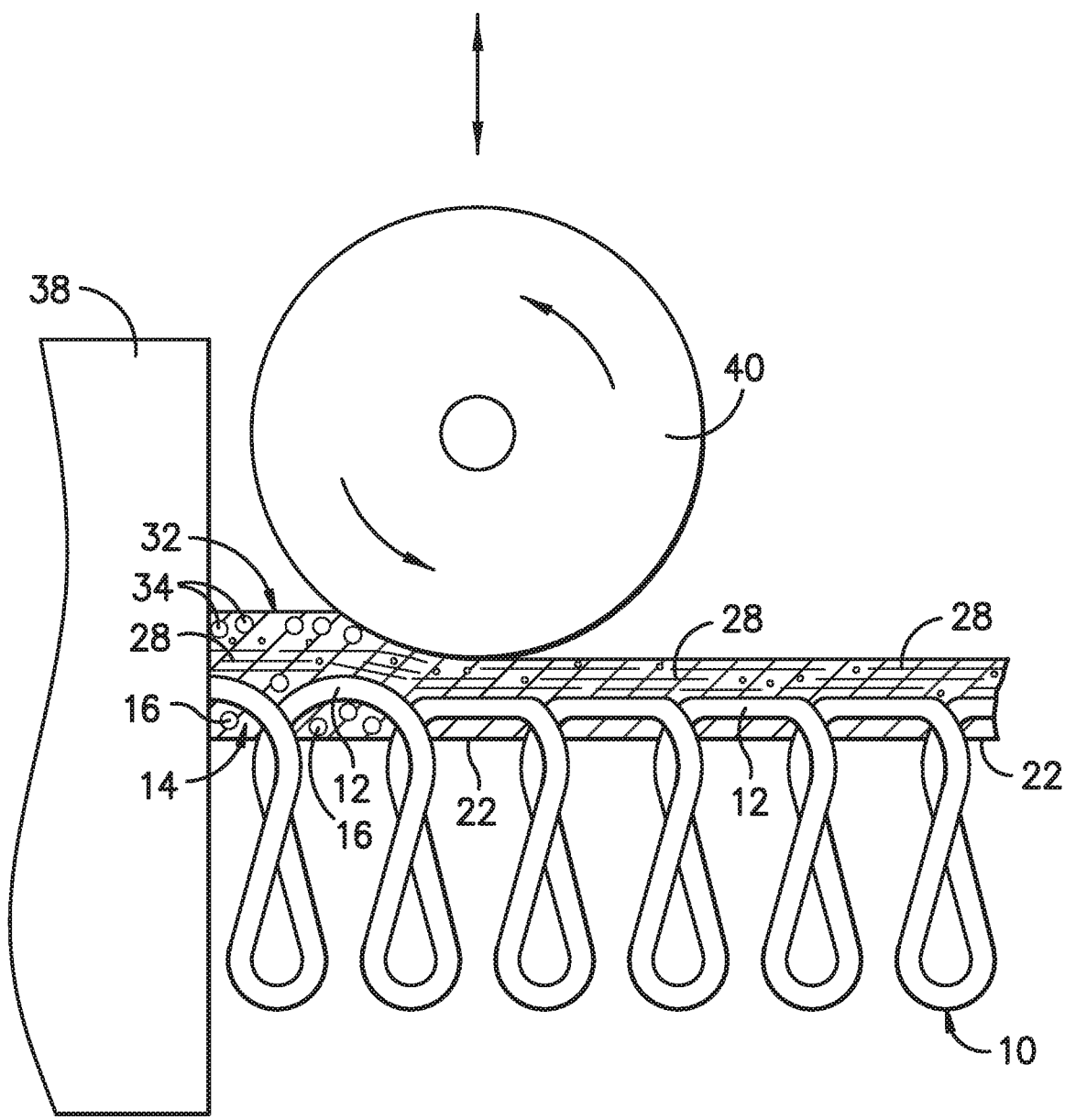
FIG. -4-

FLOOR COVERING

TECHNICAL FIELD

The present disclosure is directed to the field of textile floor coverings, such as broadloom carpet and modular carpet tiles. More particularly, according to one or more aspects provided herein, the present disclosure is directed to a floor covering including a tufted textile substrate and a reinforcement backing system.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent to the primary backing substrate. On the face side, a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of up to sixteen feet are possible with this equipment, and when sold at these widths, the carpets are referred to in the industry as "broadloom" carpets. This type of carpet is the preferred flooring material for today's residential homes and commercial buildings.

"Modular" carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced issues with stability. Without a separate reinforced floor covering and/or one or more secondary backing layers, the broadloom carpet design has the possibility to "creep" which leads to undesirable growth. Modular tiles with their heavy backing layers are stiff. As a result, there is a possibility for the modular tiles to cup or curl. Other challenges for modular tiles and broadlooms occur because of issues relating to thickness and weight variation. The manufacturers of floor coverings have significant material costs and manufacturing expenses associated with the processing and attachment of multiple backing layers and/or preformed reinforcement layers to the textile substrates.

It is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates of the floor covering tend to experience more shrinkage in the machine direction. Thus, the machine direction is almost always the more unstable direction of the floor covering.

The invention set forth herein is related to U.S. Pat. Nos. 9,339,136, 9,506,175, 9,681,768, 9,775,457,9924820, 9926657, 10132019, and 10501878. The present application discloses and claims a related method for making a carpet having a reinforcing backing layer.

SUMMARY

The present invention includes a floor covering with a fiber-reinforced backing. The floor covering may be used in broadloom products or any of a variety of modular products. The manufacturing method and resulting product includes a tufted textile substrate having a primary backing substrate and a plurality of yarns tufted through the primary backing substrate. The primary backing substrate includes a face side and a back side that is opposite to the face side with a portion of each yarn forming a stitch that is located on the back side of the primary backing substrate.

The manufacturing process begins by conditioning a first adhesive to form a plurality of voids within the adhesive. After conditioning, the adhesive is directed towards a first applicator which applies pressure in a controlled manner to force the adhesive towards the back side of the primary backing substrate. The adhesive is forced into and between the stitches which are located on the back side of the primary backing substrate. The movement of the first adhesive is controlled by the first applicator and by a vacuum that is applied at the face side of the primary backing substrate. The first adhesive is formed as a layer with the first adhesive layer being formed in the machine direction.

Spaced apart bundles of reinforcement fibers are selectively cut to form a plurality of separate reinforcement fibers having a desired length. The cut reinforcement fibers are disbursed and arranged into a desired pattern on the first adhesive layer as the first adhesive layer moves in the machine direction. The disbursing and arranging of the reinforcement fibers results in the formation of a patterned layer of reinforcement fibers which lays on the layer of first adhesive. It is preferred that the layer of reinforcement fibers be initially spaced away from the ends of the yarn stitches before curing.

After the formation of the first adhesive layer and the formation of the layer of reinforcement fibers, a layer of a second adhesive is formed on the layer of reinforcement fibers as the layer of reinforcement fibers moves in the machine direction. A sandwich like backing is formed including a layer of reinforcement fibers sandwiched between the first and second adhesive layers. The second adhesive is conditioned, to form a plurality of voids within the second adhesive, before the second adhesive is formed as a layer on the reinforcement fibers.

The sandwich like backing may be passed through an oven to dry, condition, or cure the sandwich like backing. The drying, conditioning, or curing provided by the oven does not eliminate the plurality of voids in the first and second adhesive layers, and the drying of the sandwich like backing assists in providing adhesive rigidity.

After passing through an oven, an embosser applies pressure in a controlled manner against the sandwich like backing. The sandwich like backing is compressed by the embosser, and the ends of the yarn stitches are flattened. The compression, provided by the embosser, collapses the first and second adhesive layers. The collapsing of the adhesive layers removes the volume occupied by the voids in the first and second adhesive layers, which results in the formation of a thinner and relatively solid structure. The reinforcement fiber layer is also simultaneously moved by the embosser into engagement and attachment with the flattened end surfaces of the yarn stitches and into a final location that is positioned closer to the primary backing substrate.

The compression provided by the embosser compresses both sides of the reinforcement fiber layer such that the first and second adhesive layers encapsulate the reinforcement fiber layer, and the compression bonds the adhesive and reinforcement fiber layers together. The first and second adhesive layers bond to each other and entrap the layer of reinforcement fibers between them. Further, the compression moves the reinforcement fiber layer closer to the primary backing substrate for stability and rigidity.

These and other features and advantages of the present invention will be better understood with reference to the following description and appended claims. The accompanying drawings, which constitute a part of the present specification, illustrate various embodiments of the invention, and together with the written description, serve to explain the principles of the inventive methods and products.

BRIEF DESCRIPTION OF THE DRAWINGS

A full and enabling disclosure of the present methods and resulting product, including the best mode thereof, directed to one of ordinary skill in the art, is set forth in the specification, which makes reference to the appended figures, in which:

FIG. 1 is a schematic diagram of an equipment arrangement for attaching a fiber and adhesive reinforcement backing to a tufted textile substrate.

FIG. 2 is a top view schematic diagram of disbursing and arranging the reinforcement fibers.

FIG. 3 is an end view schematic diagram of disbursing and arranging the reinforcement fibers.

FIG. 4 is an enlarged schematic diagram showing the compression of the adhesive and reinforcement fiber layers.

DETAILED DESCRIPTION

Reference will now be made to embodiments of the methods and resulting products, one or more examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

FIG. 1 is a schematic diagram, in accordance with the present invention, of an arrangement for applying adhesive and reinforcing fibers to a tufted textile substrate to form a reinforcing backing system. The floor covering includes a tufted textile substrate 10 made of yarns that are tufted through a primary backing substrate 22. As is known, the primary backing substrate 22 has a face side and a back side that is opposite to the face side. The yarns form stitches 12 on the back side of the primary backing substrate 22 and an interstitial space exists between each yarn.

The manufacturing process disclosed herein begins by conditioning a first adhesive 14 to form a plurality of voids 16 within the adhesive 14. In a preferred embodiment, adhesive 14 is a thermoplastic adhesive. It is preferred that adhesive 14 have the characteristics of being malleable and reformable when it is exposed to heat or compression. It is also preferred that the adhesive 14 be water based for assisting in the manufacturing process as will be described further. For example, air may be injected into a water based adhesive 14 to create voids in the form of air bubbles for the purpose of allowing a desired compression of the adhesive 14 during the manufacturing process.

After conditioning adhesive 14 to establish voids 16, the adhesive 14 is moved in the machine direction to a first applicator 18. Applicator 18 applies pressure in a controlled manner to force adhesive 14 towards the back side of the primary backing substrate 22. Adhesive 14 is forced into the stitches 12 and also forced into the spaces between the stitches 12. The movement of adhesive 14 is further controlled by a vacuum 20 that is applied at the face side of the primary backing substrate 22. Applicator 18 and vacuum 20 form a layer of the first adhesive 14 with the layer of adhesive 14 having a desired thickness and with the layer of adhesive 14 being movable in the machine direction.

Referring to FIG. 1, one or more bundles 24 of reinforcement fibers 28 are positioned relative to the moving layer of first adhesive 14. A cutting mechanism 26 cuts fiber bundle(s) 24 into a plurality of separate reinforcement fibers 28. Each reinforcement fiber 28 is cut into a desired length. The cut reinforcement fibers 14 are disbursed and arranged into a desired pattern as schematically shown in FIGS. 2 and 3.

A disbursing and arranging device 30 for the reinforcement fibers 28 is schematically illustrated in FIGS. 1-3. After being cut from the bundle(s) 24, the cut reinforcement fibers 28 are positioned in a generally linear or machine direction configuration on the layer of moving adhesive 14. FIG. 2 illustrates the generally linear or machine direction configuration of the reinforcement fibers 28 on adhesive 14 after the fibers 28 have been cut from bundle(s) 24. The cut and linearly positioned reinforcement fibers 28 from two spaced apart fiber bundles 24 are shown in FIGS. 2 and 3.

After the reinforcement fibers 28 are initially positioned into a configuration that is linear or generally in the machine direction, the disbursing and arranging device 30 is moved in a horizontal direction that is generally perpendicular to the machine direction. As illustrated in FIGS. 2 and 3, device 30 includes fingers 42. Device 30 is moved vertically towards and away from the stitches 12, and device 30 is also reciprocated or oscillated horizontally in a direction that is perpendicular to the machine direction. The amount and type of disbursing and arranging of the the reinforcement fibers 28 may be controlled by selectively adjusting the speed of movement of the reinforcement fibers 28 in the machine direction and the duration of the reciprocation or oscillation provided by device 30.

The movement of device 30 causes fingers 42 to disburse the reinforcement fibers 28 in a horizontal direction and to arrange the reinforcement fibers 28 into a desired pattern. For example, as shown in FIG. 2, the desired pattern may include the positioning of reinforcement fibers 28 in the machine direction and the positioning of reinforcement fibers at various other angles relative to the machine direction. Further, as shown in FIG. 2, the reinforcement fibers 28 have a sufficient length to permit bending or curling of the fibers 28 such that the bent or curled fibers 28 extend in more than one direction. A patterned reinforcement layer, including a multi-directional and overlapping arrangement of reinforcement fibers 28, is initially formed, preferably, at a location that is spaced away from the ends of the stitches 12.

After the formation of the layer of first adhesive 14 and the formation of the patterned layer of reinforcement fibers 28, a layer of a second adhesive 32 is formed. The second adhesive 32 is also conditioned to form a plurality of voids 34 within the second adhesive 32. It is preferred that the second adhesive 32 is a thermoplastic adhesive that is malleable and reformable when it is exposed to heat or compression. It is also preferred that the second adhesive 32 be a water based adhesive. Similar to the first adhesive 14, air may be injected into a water based adhesive 32 to create voids 34 in the form of air bubbles for the purpose of allowing a desired compression of the adhesive 32 during the manufacturing process.

As shown in FIG. 1, the conditioned second adhesive 32 is formed into a layer by a second applicator 36. The layer of adhesive 32 is formed and positioned to lay on the patterned layer of reinforcement fibers 28. A sandwich like reinforcement backing results from the layer of reinforcement fibers 28, the layer of first adhesive 14, and the layer of second adhesive 32. That is, the patterned reinforcement fibers 28 are sandwiched between the layers of adhesive 14 and adhesive 32 to form a sandwich like reinforcement backing.

The sandwich like reinforcement backing, consisting of sandwich layers of reinforcement fibers 28 and adhesives 14 and 32, may be passed through an oven 38 to dry, condition, or cure the sandwich like reinforcement backing. It is intended that the drying, conditioning, or curing provided by oven 38 will not eliminate the voids 16 and voids 34 in the first and second adhesives 14 and 32. The drying treatment provided by oven 38 removes water and provides a desirable adhesive rigidity. Since the preferred adhesive is a water based thermoplastic that contains, for example, air voids, it is desirable to remove the water from the adhesive and to dry the adhesive for providing some rigidity to it while allowing the adhesive to remain malleable and reformable.

As shown in FIGS. 1 and 4, after passing through the oven 38, a third applicator 40 applies pressure in a controlled manner against the sandwich like reinforcement backing consisting of the layers of reinforcement fibers 28 and adhesives 14 and 32. The third applicator 40 can be an embosser which compresses the layers of reinforcement fibers 28 and adhesives 14 and 32, and flattens the ends of the stitches 12.

The compression provided by the third applicator 40, collapses the relatively rigid layers of dried adhesive 14 and 32. The compressing and collapsing actions applied against the adhesive layers reduces the volume occupied by the voids 16 and 34 in the first and second layers of adhesive 14 and 32. This results in the formation of a thinner and relatively solid structure consisting of layers of compressed and collapsed adhesive 14 and 32, which sandwich a layer of reinforcement fibers 28. The resulting layers of reinforcement fibers 28 and adhesives 14 and 32, are also simultaneously moved by the third applicator 40 into engagement and attachment with the flattened end surfaces of the yarn stitches 12. Further, as shown in FIGS. 1 and 4, the layer of reinforcement fibers 22 is moved into a final location that is close to or in engagement with the primary backing substrate 22.

The compression from the third applicator 40 causes the compression of both sides of the layer of reinforcement fibers 28 such that the layers of the first and second adhesives 14 and 32 encapsulate and entrap the layer of reinforcement fibers 28. Further, the compression and collapsing of the layers of adhesive 14 and 32 allows the adhesives 14 and 32 to bond to each other. Moreover, by arranging the reinforcement fibers 28 into a desired pattern and moving the layer of reinforcement fibers 22 to a final position, after curing, that is close to or in engagement with the primary backing substrate 22, additional stability and rigidity is provided to the tufted textile substrate 10.

The present invention may be embodied in other forms without departing from the spirit and the essential attributes thereof, and, accordingly, references should be made to the appended claims, and not just to the foregoing specification, as indicative of the scope of the invention.

What is claimed is:

1. A method of manufacturing a floor covering, the method comprising the steps of:
   manufacturing the floor covering from a group of components including a tufted textile substrate having a primary backing substrate extending in a first direction and a plurality of yarns tufted through the primary backing substrate, the primary backing substrate having a face side and a back side opposite to the face side, a portion of each yarn forming a stitch portion having an end that is located on the back side of the primary backing substrate, and spaces existing between the stitch portions;
   conditioning a first adhesive to form a plurality of voids within the first adhesive, applying pressure on the first adhesive, forcing the first adhesive to move towards the back side of the primary backing substrate, forming a layer of the first adhesive, and moving the layer of the first adhesive in the first direction;
   cutting at least one bundle of reinforcement fibers and forming a plurality of separate reinforcement fibers on the first adhesive in the first direction;
   forming a patterned layer of reinforcement fibers on the layer of the first adhesive, forming said patterned layer of reinforcement fibers from the plurality of separate reinforcement fibers, forming said patterned layer of reinforcement fibers at an initial position that is spaced from the primary backing substrate, and moving said patterned layer of reinforcement fibers in the first direction with the layer of the first adhesive;
   conditioning a second adhesive to form a plurality of voids within the second adhesive, forming a layer of the second adhesive, and moving the layer of the second adhesive in the first direction;
   sandwiching said patterned layer of reinforcement fibers between the layers of the first and second adhesives, and moving said patterned layer of reinforcement fibers and the layers of the first and second adhesives in the first direction; and
   compressing the layers of the first adhesive and the second adhesive and simultaneously collapsing the voids in the first and second adhesives, and simultaneously moving the patterned layer of reinforcement fibers to a final position that is closer to the primary backing substrate than the initial position of the patterned layer of reinforcement fibers.

2. The method of manufacturing a floor covering according to claim 1 wherein forming the patterned layer of reinforcement fibers further comprising disbursing and arranging the plurality of separate reinforcement fibers and forming a multi-directional and overlapping patterned layer of reinforcement fibers.

3. The method of manufacturing a floor covering according to claim 1 further comprising drying the layers of the first and second adhesives before compressing the layers of the first and second adhesives to provide rigidity for the layers of the first and second adhesives without eliminating the voids in the first and second adhesives.

4. A method of manufacturing a floor covering, the method comprising the steps of:
   manufacturing the floor covering from a group of components including a tufted textile substrate having a primary backing substrate, said primary backing substrate being moved in a first direction, and a plurality of yarns tufted through the primary backing substrate, the primary backing substrate having a face side and a back side opposite to the face side, a portion of each yarn forming a stitch portion having an end that is located on the back side of the primary backing substrate, and spaces existing between the stitch portions;

conditioning a first adhesive to form a plurality of voids within the first adhesive, forming a layer of the first adhesive, and moving the layer of the first adhesive in the first direction;

forming a layer of reinforcement fibers in the first direction at a first location that is spaced from the primary backing substrate, and moving said layer of reinforcement fibers in the first direction;

conditioning a second adhesive to form a plurality of voids within the second adhesive, forming a layer of the second adhesive, and moving the layer of the second adhesive in the first direction;

positioning the layer of reinforcement fibers between the layers of first and second adhesives; and compressing the layers of the first adhesive and the second adhesive to simultaneously collapse the voids in the first and second adhesives and move the layer of reinforcement fibers to a second location that is closer to the primary backing substrate than the first location, and flattening the ends of the stitch portions to form engagement surfaces for connecting the layer of reinforcement fibers to the stitch portions.

5. The method of manufacturing a floor covering according to claim 4 further comprising encapsulating the reinforcement fibers with the layers of first and second adhesives and bonding together the layers of first and second adhesives.

6. The method of manufacturing a floor covering according to claim 4 further comprising disbursing and arranging the reinforcement fibers and forming a multi-directional and overlapping pattern layer of reinforcement fibers.

7. The method of manufacturing a floor covering according to claim 4 further comprising drying the layers of the first and second adhesives before compressing the layers of the first and second adhesives to provide rigidity to the layers of the first and second adhesives without eliminating the voids in the first and second adhesives.

8. A method of manufacturing a floor covering, the method comprising the steps of:

manufacturing the floor covering from a group of components including a tufted textile substrate having a primary backing substrate, moving said primary backing substrate in a first direction, and a plurality of yarns tufted through the primary backing substrate, the primary backing substrate having a face side and a back side opposite to the face side, a portion of each yarn forming a stitch portion having an end that is located on the back side of the primary backing substrate, and spaces existing between the stitch portions;

forming a plurality of voids in a first adhesive layer, forming the first adhesive layer in engagement with said primary backing substrate, and moving said first adhesive layer in the first direction;

forming a layer of reinforcement fibers on a side of the first adhesive layer, positioning said layer of reinforcement fibers at an initial location that is spaced from the primary backing substrate and spaced from the ends of the stitches, and moving the layer of reinforcement fibers in the first direction;

forming a plurality of voids in a second adhesive layer, positioning the second adhesive layer into engagement with a side of the layer of reinforcement fibers so that the layer of reinforcement fibers is located between the layers of first and second adhesives, and moving said second adhesive layer in the first direction;

curing the layers of the first and second adhesives and providing rigidity without eliminating the voids in the first and second adhesives; and compressing the layers of the first and second adhesives after curing the layers of the first and second adhesives, simultaneously collapsing the voids in the first and second adhesives and moving the layer of reinforcement fibers to a final location, engaging and attaching the layer of reinforcement fibers to the ends of the stitches, and reducing the space between the layer of reinforcement fibers and the primary backing substrate.

9. The method of manufacturing a floor covering according to claim 8 further comprising flattening the ends of the stitch portions to form engagement and attachment surfaces for connecting the layer of reinforcement fibers to the stitch portions.

10. The method of manufacturing a floor covering according to claim 8 further comprising disbursing and arranging the reinforcement fibers and forming a multi-directional and overlapping pattern of reinforcement fibers.

11. The method of manufacturing a floor covering according to claim 8 further comprising encapsulating the reinforcement fibers with the layers of first and second adhesives and bonding together the layers of first and second adhesives.

\* \* \* \* \*